United States Patent [19]

Willkomm et al.

[11] Patent Number: 5,741,847
[45] Date of Patent: Apr. 21, 1998

[54] POLYMER POLYOLS CONTAINING HALOGENATED AROMATIC MONOMERS AND POLYURETHANE FOAM MADE THEREFROM

[75] Inventors: Wayne R. Willkomm, Lake Jackson; Ruben Solis, Richwood; Kenneth J. Hinze, Lake Jackson, all of Tex.

[73] Assignee: The Dow Chemical Company, Midland, Mich.

[21] Appl. No.: 652,179

[22] Filed: May 23, 1996

[51] Int. Cl.$^6$ .................. C08L 27/00; C08L 27/24; C08G 65/32
[52] U.S. Cl. .................. 524/551; 524/507; 524/554; 521/177; 526/292.5; 526/294; 526/295
[58] Field of Search .................. 524/507, 551, 524/554; 521/171, 177; 526/292.5, 292.7, 294, 295

[56] References Cited

U.S. PATENT DOCUMENTS

| | | | |
|---|---|---|---|
| 3,404,107 | 10/1968 | Bearden et al. | 260/2.5 |
| 3,706,680 | 12/1972 | Booth | 260/2.5 |
| 3,725,509 | 4/1973 | Kraft et al. | 260/899 |
| 4,094,910 | 6/1978 | Austin et al. | 260/613 |
| 4,107,104 | 8/1978 | Dubeck et al. | 521/171 |
| 4,128,532 | 12/1978 | Eimers et al. | 528/79 |
| 4,149,987 | 4/1979 | Austin et al. | 252/186 |
| 4,202,947 | 5/1980 | Preston et al. | 521/174 |
| 4,208,314 | 6/1980 | Priest et al. | 260/33.2 R |
| 4,213,837 | 7/1980 | Bristowe et al. | 204/159.19 |
| 4,282,331 | 8/1981 | Priest | 521/137 |
| 4,334,032 | 6/1982 | Patton et al. | 521/115 |
| 4,338,242 | 7/1982 | Burton | 523/436 |
| 4,345,042 | 8/1982 | Kuroda et al. | 521/112 |
| 4,451,587 | 5/1984 | Keshi et al. | 521/171 |
| 4,486,551 | 12/1984 | Sandler et al. | 521/171 |
| 4,539,339 | 9/1985 | Cuscurida et al. | 521/137 |
| 4,539,378 | 9/1985 | Cuscurida et al. | 521/177 |
| 4,542,164 | 9/1985 | Nishioka et al. | 521/135 |
| 4,623,674 | 11/1986 | Bailey, Jr. | 521/137 |
| 4,668,710 | 5/1987 | Pawloski et al. | 521/171 |
| 4,714,720 | 12/1987 | Collin | 521/171 |
| 4,734,443 | 3/1988 | Pawloski et al. | 521/171 |
| 4,745,137 | 5/1988 | Thomas et al. | 521/137 |
| 4,814,360 | 3/1989 | McBrayer | 521/171 |
| 4,837,263 | 6/1989 | Gastinger et al. | 524/377 |
| 4,892,892 | 1/1990 | Favstritsky et al. | 521/107 |
| 5,059,641 | 10/1991 | Hayes et al. | 523/456 |
| 5,081,180 | 1/1992 | Bourguignon et al. | 524/762 |
| 5,091,436 | 2/1992 | Frisch et al. | 521/137 |
| 5,225,453 | 7/1993 | Yamamori | 521/137 |
| 5,225,498 | 7/1993 | Sorathia et al. | 528/76 |
| 5,250,581 | 10/1993 | Gastinger et al. | 521/137 |
| 5,378,743 | 1/1995 | Liedtke | 523/523 |

OTHER PUBLICATIONS

Derwent Publications, 86–228375/35, Kokoku Chem Ind KK, J6 1157–515–A, Dec. 28, 1984.

*Primary Examiner*—Tae Yoon
*Attorney, Agent, or Firm*—Kevin J. Nilsen

[57] ABSTRACT

A polymer polyol is produced by a process comprising free radical polymerizing an addition polymerizable di-(substituted phenyl)monomer (e.g., methacrylic ester of diglycidylether of tetrabromobisphenol A) component in the presence of a polyol, wherein the monomer has at least one aromatic halogen and at least one aromatic ethylenically unsaturated substituent. The polymer polyol can also be made by copolymerizing said monomer with an additional ethylenically unsaturated monomer component such as styrene and acrylonitrile. Said polymer polyols are reacted with a polyisocyanate compound forming a flame retardant polyurethane foam.

22 Claims, No Drawings

POLYMER POLYOLS CONTAINING HALOGENATED AROMATIC MONOMERS AND POLYURETHANE FOAM MADE THEREFROM

FIELD OF THE INVENTION

The invention relates to polymer polyols useful in the synthesis of polyurethane compositions having improved flame retardancy. In particular, the polymer polyols are useful in making polyurethane foams.

BACKGROUND OF THE INVENTION

Polyurethanes are formed by the reaction of a polyisocyanate compound such as toluene diisocyanate (TDI) and diphenylmethane diisocyanate (MDI) with a polyhydroxyl compound such as a polyol. When forming a polyurethane foam, typically water is reacted simultaneously with the isocyanate causing carbon dioxide evolution which causes the foaming of the polyurethane. Foams of polyurethane are widely used as cushions in furniture and automobiles.

In the manufacture of polyurethane foams, it is common to add other materials to increase the rate of the polyurethane reaction, enhance foam formation and improve the resultant foam properties. For example, catalysts such as a tertiary amine or an organometallic compound may be added to increase the reaction rate of the isocyanate with the polyol or water. Foam formation additives may include, for example, silicone surfactant and foam control compounds and finely divided solids such as a copolymer polyol (e.g., styrene-acrylonitrile copolymer dispersed in a polyol) which tend to lead to cell opening and, hence, typically results in a flexible foam. Other polyurethane foam additives include antioxidants, stabilizers and flame retardants. Flame retardants inhibit the burning of a polyurethane foam when ignited.

Examples of flame retardants include antimony trioxide, phosphate ester plasticizers and halogenated compounds. When the retardant is a low molecular weight liquid, the liquid tends to volatilize with time causing, for example, the undesirable fogging of the windows in an automobile. On the other hand, solid flame retardants (e.g., melamine) tend to increase the viscosity of the polyol-filler dispersion which may cause non-uniform mixing and, hence, cause nonuniform cell opening resulting in a significant density gradient in the foam from top to bottom.

U.S. Pat. Nos. 3,655,553; 3,953,393 and 4,214,055 describe polymer polyols made by homopolymerizing a vinyl chloride or vinylidene chloride monomer, or copolymerizing said monomer with, for example, styrene and acrylonitrile in a polyol. These materials are said to produce polyurethane foams having improved fire retardant properties. However, polymers of vinyl and vinylidene chloride are thermally unstable. Thermal decomposition of the vinyl or vinylidene chloride polymer or copolymer evolves HCl. When forming a polyurethane foam, the evolved HCl tends to deactivate the urethane catalyst and corrode the polyurethane processing equipment.

U.S. Pat. No. 5,250,581 describes a polymer polyol wherein the polymer is formed from tribromostyrene and acrylonitrile. Polyurethane foams made with this polymer polyol are reported to have improved flame resistance compared to polyurethanes Formed from conventional styrene-acrylonitrile polymer polyols. However, the polymer of this polymer polyol contained large quantities of tribromostyrene. Because tribromostyrene evolves toxic fumes when burned and it is expensive, large quantities of tribromostyrene are undesirable in a polyurethane foam. In addition, the foams that were described all contained a second fire retardant compound which may contribute to fogging and difficulties in forming a uniform foam previously described.

Therefore, it would be desirable to provide a polymer polyol and a polyurethane made therefrom, the foam displaying acceptable flame retardancy while avoiding the deficiencies of the prior art just described.

SUMMARY OF THE INVENTION

A first aspect of this invention is a dispersion of particles of a polymer of an addition polymerizable monomer having the structure:

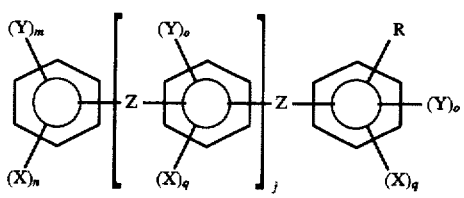

wherein
j is a whole number from 0 to 4,
Z is selected from the group consisting of:
  a single bond;
  a substituted or unsubstituted divalent hydrocarbon radical,
  a divalent radical selected from the group consisting of: S, $S_2$, SO, $SO_2$, O and CO,
X is a halogen wherein "n" is an integer from 1 to 5 and "q" is an integer from 1 to 4,
R is a substituted or unsubstituted ethylenically unsaturated hydrocarbon monovalent radical having:
  (a) up to about 12 carbons;
  (b) at least one free radical polymerizable carbon-carbon double bond, and
Y is a monovalent radical selected from the group consisting of:
  hydrogen;
  mercaptan;
  hydroxyl and
  a substituted or unsubstituted hydrocarbon monovalent radical having at most about 12 carbons,
wherein "o" is an integer equal to 4 minus "q" and "m" is an integer equal to 5 minus "n" in a polyol.

A second aspect of this invention is a polyurethane foam containing particles of a polymer of an addition polymerizable monomer having the structure:

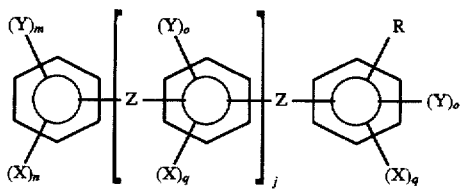

wherein
j is a whole number from 0 to 4,
Z is selected from the group consisting of:
  a single bond;
  a substituted or unsubstituted divalent hydrocarbon radical,
  a divalent radical selected from the group consisting of: S, $S_2$, SO, $SO_2$, O and CO.

X is a halogen wherein "n" is an integer from 1 to 5 and "q" is an integer from 1 to 4, R is a substituted or unsubstituted ethylenically unsaturated hydrocarbon monovalent radical having:
(a) up to about 12 carbons;
(b) at least one free radical polymerizable carbon-carbon double bond, and Y is a monovalent radical selected from the group consisting of:
hydrogen;
mercaptan;
hydroxyl and
a substituted or unsubstituted hydrocarbon monovalent radical having at most about 12 carbons, wherein "o" is an integer equal to 4 minus "q" and "m" is an integer equal to 5 minus "n".

A polyurethane foam produced using the polymer polyol of this invention displays good flame retardancy even at low halogen concentrations in the foam and even in the absence of any other additional flame retardants. In addition, the polymer polyol may be formed and used with existing polyurethane foam processing equipment.

DETAILED DESCRIPTION OF THE INVENTION

The polymer particles dispersed in the polyol (i.e., polymer polyol) are formed from a monomer having the structure:

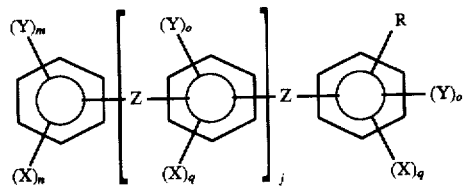

wherein Z, Y, X, Z, j, o, q, m and n are as described above.

The "Z" group of the monomer is selected from the group consisting of: a single bond; a substituted or unsubstituted divalent hydrocarbon radical, the hydrocarbon radical being of a size which fails to substantially hinder the polymerization of the monomer; and a divalent radical selected from the group consisting of: S, $S_2$, SO, $SO_2$, O and CO. The "Z" group also does not participate in the free radical polymerization to form the polymer of the polymer polyol. When "Z" is an unsubstituted or substituted hydrocarbon radical, the radical is such that it does not stop the monomer from free radically polymerizing to form the polymer particles. The "Z" group of the monomer is preferably a substituted or unsubstituted divalent hydrocarbon radical or divalent radical selected from the group consisting of: S, $S_2$, SO, $SO_2$, O and CO. More preferably "Z" is a substituted or unsubstituted divalent hydrocarbon radical. Desirably, the hydrocarbon radical has at most about 35 carbons. Preferably the hydrocarbon radical is a methylene, which may be substituted with a group such as $CH_3$, $C_2H_5$, $C_3H_7$, n-$C_3H_7$, i-$C_3H_7$, cyclohexyl, bicyclo[2.2.1]heptyl, phenyl, $CF_2$, $CF_3$, $CCl_3$, $CF_2Cl$, CN, $(CH_2)_2COOCH_3$ or $PO(OCH_3)_2$. More preferably Z is methylene directly bonded to two $CH_3$ groups.

The monovalent radical "Y" is a monovalent radical selected from the group consisting of: hydrogen; mercaptan; hydroxyl and a substituted or unsubstituted hydrocarbon monovalent radical having at most about 12 carbons. The monovalent radical "Y" of the monomer is preferably a group lacking a free radical polymerizable group such as an ethylenic unsaturated bond (carbon-carbon double bond). More preferably "Y" is hydrogen, mercaptan, hydroxyl or an alkyl. Most preferably Y is hydrogen.

The "R" of the monomer is a substituted or unsubstituted ethylenically unsaturated hydrocarbon monovalent radical having up to about 12 carbons and at least one free radical polymerizable carbon-carbon double bond. Preferably "R" is a monovalent linear or branched radical. More preferably "R" is a branched radical. Preferably the branched radical contains oxygen. Most preferably "R" is a methacrylic ester of diglycidylether which is represented by the structure:

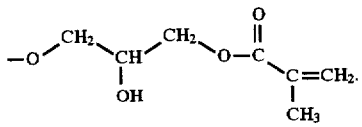

The "X" group of the monomer may be any halogen but is preferably Cl, Br or I. More preferably "X" is bromine. It is preferred that the quantity of "X" is an amount where "n" and "o" described above each are equal to 2.

The repeating units of the monomer as represented by "j" is a whole number from 0 to 4. Preferably "j" is 0, 2 or 4. More preferably "j" is 0.

Preferred monomers include 2,2-bis(4-methacrylic ester of diglycidylether-3,5dibromophenyl)propane, herein a methacrylic ester of diglycidylether of tetrabromobisphenol A (MEDTA) or oligomer thereof which may be represented by the structure:

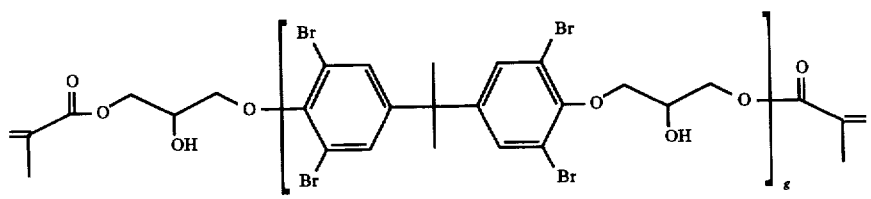

wherein "g" is an integer from 1 to 3. The methacrylic ester of diglycidylether of tetrabromobisphenol A (MEDTA) is commercially available under the trademark "DERAKANE 510A" of The Dow Chemical Company in a 40 weight percent styrene-60 weight percent MEDTA solution, wherein the MEDTA is a mixture of monomer ("g"=1) and oligomers ("g"=2 or 3). Another suitable monomer is bis-allylether of tetrabromobisphenol A available from Great Lakes Chemical Corp. under the trademark "BE-51".

Herein a free radical polymerizable carbon—carbon double bond may be any that can react to form an addition polymer. The carbon—carbon double bond may be conjugated with another carbon—carbon double bond, but it is preferred that the double bond is unconjugated with another carbon—carbon double bond. Exemplary carbon—carbon double bond substituents of "R" may be represented by the following structures:

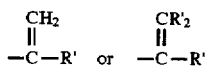

wherein each R' is individually hydrogen or lower alkyl $C_1$-$C_4$). The carbon—carbon double bond may also be an ethylenic unsaturated double bond in a cyclic structure such as a maleimide radical having the structure:

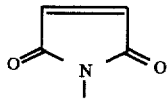

A suitable monomer may be formed by reacting a halogenated diphenylhydroxy compound such as a bis-hydroxy-substituted-phenyl compound and one or more second compounds. The halogenated diphenyl hydroxy compound can be represented by the formula:

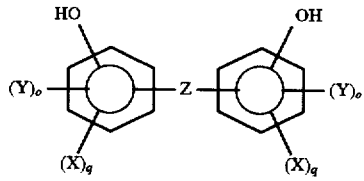

wherein Z, Y, X, q and o are as defined before. The bridging radical represented by Z in the above formula is preferably a carbon atom to which is bonded to one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$, $CCl_3$, $CF_2Cl$, CN, $(CH_2)_2COOCH_3$ or $PO(OCH_3)_2$. Preferably the bis-hydroxy-substituted-phenyl compound is a 2,2-bis(3,5-dibromo-4-hydroxyphenyl)propane referred to herein as tetrabromobisphenol A. Exemplary second compounds include compounds containing a free radical polymerizable carbon—carbon double bond and a group which can undergo a condensation reaction such as an epoxy, alcohol, organic acid, anhydride, aldehyde, ketone and ester.

The above suitable monomers may be formed via a condensation reaction under conditions known in the art such as those described by U.S. Pat. Nos. 3,066,112; 3,179,623; 3,221,043; 3,256,226; 3,621,093; 3,367,992 and 3,524,901, each incorporated herein by reference.

The monomer may be homopolymerized or copolymerized with one or more additional monomers in a polyol. Suitable additional monomers include other ethylenically unsaturated monomers (monomers containing a free radical polymerizable carbon—carbon double bond) which copolymerize to form copolymers with the aforementioned monomers of this invention. Representative additional monomers include aliphatic conjugated dienes such as butadiene and isoprene; monovinylidene aromatic monomers such as styrene, α-methyl styrene, ar-methyl styrene, ar-(t-butyl)styrene, ar-chlorostyrene, ar-cyanostyrene and ar-bromostyrene, dibromostyrene and tribromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethylacrylamide, N-(dimethylaminomethyl)acrylamide and the like, vinyl esters such as vinyl acetate; vinyl ethers; vinyl ketones; vinyl and vinylidene halides such as vinylidene chloride, vinyl chloride, chlorostyrene, 2,5-dichlorostyrene, bromostyrene, fluorostyrene and trifluoromethylstyrene; and maleimide, N-arylmaleimide, and N-alkymaleimides such as maleimide, N-ethyl maleimide, as well as a wide variety of other ethylenically unsaturated materials which copolymerize with the aforementioned di-substituted halogenated phenyl monomer, many of which have heretofore been employed in the formation of copolymer polyols as described in U.S. Pat. Nos. 3,823,201 and 3,383,351, incorporated herein by reference. It is understood that mixtures of two or more of the aforementioned monomers are also suitable in making the copolymer. Of the foregoing additional monomers, the monovinylidene aromatic monomers such as styrene and the ethylenically unsaturated nitriles such as acrylonitrile are especially preferred. Most preferably the additional monomer is styrene, acrylonitrile or mixture thereof.

The polyol according to this invention can be a polyol such as those described in U.S. Pat. Nos. 3,383,351; 3,823,201; 4,119,586 and 4,148,840, each incorporated herein by reference. Exemplary polyols include polyhydroxyalkane polyols, polyoxyalkylene polyols, alkylene oxide adducts of polyhydroxyalkanes, alkylene oxide adducts of non-reducing sugars and sugar derivitives, alkylene oxide adducts of phosphorus and polyphosphorus acids, alkylene oxide adducts of polyphenols and polyols derived from natural oils such as caster oil. Preferably the polyols are glycols, triols or higher functionality polyols of poly(oxyethylene), poly(oxypropylene), poly(oxypropyleneoxyethylene) or mixtures thereof.

The polyols employed may have hydroxyl numbers which vary over a large range, the polyols being selected based upon the desired polyurethane foam properties that are desired. In general, the polyols can have a hydroxyl number that ranges from about 20 to about 1000. Preferably the hydroxyl number is at least about 25, and more preferably at least about 30 to preferably at most about 600, and more preferably at most about 450. The hydroxyl number is defined as the number of milligrams of potassium hydroxide required for the complete hydrolysis of the fully acelated derivative prepared from 1 gram of polyol.

The polyol employed in producing a particular polyurethane composition of this invention depends upon the end-use of the polyurethane product to be produced, in that the hydroxyl number is selected to result in flexible or semi-flexible foams or elastomers when the polymer polyol produced from the polyol is converted to a polyurethane. The polyols preferably possess a hydroxyl number of from about 50 to about 150 for semiflexible foams and from about 20 to about 70 for flexible foams. Mixtures of polyols can be used.

The polymer polyol may be produced by polymerizing the monomer in the presence of a polyol by methods known in the art such as those described in U.S. Pat. Nos. 4,104,236; 3,823,201; 4,148,840; 4,652,589; 4,390645; 3,833,641 and 4,242,476, each incorporated herein by reference.

The polymer polyol of this invention may be prepared from an amount of the monomer from 0.5 to 100% by weight of the total amount of monomer. Desirably, the amount of said monomer is at most 50% by weight of the total amount of monomer. Preferably the amount of said monomer is at most about 20%, more preferably at most about 15%, and most preferably at most about 12% to at least about 0.5%, preferably at least about 1%, and more preferably at least about 2% by weight of the total amount of monomer.

When forming the polymer polyol it is advantageous to polymerize in the presence of a polymerization initiator. Representative initiators include free radical vinyl polymerization initiators such as peroxides, persulfates, perborates, percarbonates and azo compounds. Specific examples include 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexonoate, t-butylperoxypivalate, 2,5-dimethyl-hexane-2, 5-di-peroxy-2-ethylhexoate, t-butylperoxyneodeconate, t-butylperoxybenzoate, t-butylperoxycrotonate, t-butylperoxyisobutyrate, di-t-butylperoxyphthalate and 2,2'-azo-bis(methylbutanenitrile). When the monomers are styrene, acrylonitrile and the di-substituted halogenated phenyl monomer, the initiator is preferably 2,2'-azo-bis (methylbutanenitrile), commercially available under the trademark "VAZO 67" of E. I. Du Pont De Nemours and Co. The initiator is desirably added in an amount sufficient to initiate polymerization. Typically, the amount of initiator ranges from about 0.4 to about 1.2% by weight of all of the monomers.

The polymer polyol may also be formed in the presence of other additives such as an organic solvent, chain transfer agent, stabilizer and flame retardants, all of which are common in the art. An example of a solvent is toluene. Exemplary chain transfer agents include dodecylmercaptan and isopropyl alcohol. Preferably the chain transfer agent is dodecylmercaptan. Stabilizers may be used to increase the polymer content in the polyol, while the polymer polyol still has a low viscosity and acceptable resistance to polymer sedimentation. Stabilizers typically are polyether polyols that have deliberately added unsaturation and thus, can be grafted onto the growing polymer chains of the polymer of the polymer polyol. Exemplary stabilizers include those described in U.S. Pat. Nos. 4,883,832; 4,198,488 and 3,823, 201, each incorporated herein by reference. Exemplary flame retardants include antimony trioxide, phosphate ester plasticizers and halogenated compounds other than the di-substituted halogenated phenyl monomer. Even though flame retardants may be included in the polymer polyol or polyurethane made therefrom, it is preferred that no additional flame retardant is used.

Typically, the temperature of the reaction is dependent on the half life of the initiator used in forming the polymer polyol and the decomposition temperature of the polymer polyol made or components used to make the polymer polyol. Typically, the temperature is a temperature that results in the half life of the initiator that is shorter than about 6 minutes and preferably at most about 2 to 3 minutes. Generally, the temperature is typically at least about 60° C., preferably at least about 80° C., and more preferably at least about 100° C. to preferably at most about 150° C., more preferably at most about 140° C., and most preferably at most about 135° C.

The time of reaction may be varied over a wide range depending on the desired polyol properties such as viscosity. Generally, longer times result in higher product viscosities. Preferably the time is at least about 5 minutes, more preferably at least about 10 minutes, and most preferably at least about 12 minutes to preferably at most about 6 hours, more preferably at most about 5 hours, and most preferably at most about 4 hours.

The pressure of the reaction may be varied over a large range and pressure in excess of ambient or atmospheric is typically used to limit the volatilization of the components in the reaction mixture. The pressure is desirably at least atmospheric or ambient pressure and preferably at least about 0.05 MPa, and more preferably at least about 0.10 MPa to preferably at most about 1.0 MPa, and more preferably at most about 0.6 MPa. The polymer polyol may be formed by a continuous, batch, or semi-batch process wherein the monomers are polymerized at the above conditions. Also, the reaction is desirably carried out in an atmosphere inert to the reactants such as nitrogen.

The solids content, viscosity, and particle size of the polymer polyol that is formed may vary over a wide range depending on the desired properties of the polymer polyol and desired properties of a polyurethane made therefrom. The polymer polyol that is formed typically has a solids content (i.e., weight of the particles of polymer) of at least about 1% to about at most about 70% by weight of the total weight of the polymer polyol. Preferably the solids content is at least about 8%, and more preferably at least about 10% to preferably at most about 60%, and more preferably at most about 55% by weight of the total weight of the polymer polyol. The polymer polyol typically has a viscosity of at most about 20,000, preferably at most about 10,000, and more preferably at most about 7000 mPas (milliPascal-seconds). The particles desirably have a particle size between about 0.1 to about 100 microns in diameter. Preferably the volume average particle size is greater than about 0.15, more preferably greater than about 0.2, and most preferably greater than about 0.25 to preferably less than about 60, more preferably less than about 50, and most preferably less than about 10 microns in diameter.

When forming a polyurethane foam according to this invention, the foam can be formed by any convenient method, wherein the polymer polyol of this invention is reacted with an organic polyisocyanate in the presence of a blowing agent such as water resulting in the desired polyurethane foam. The foam may be formed by known techniques such as prepolymer (described in U.S. Pat. No. 4,390,645), one shot (described in U.S. Pat. No. 2,866,744) or frothing (described in U.S. Pat. Nos. 3,755,212; 3,849, 156 and 3,821,130), each of the aforementioned patents incorporated herein by reference. The method to produce the foam may be carried out in the presence of catalysts, surface active agents, chain extending agents, fillers such as calcium carbonate, pigments such as titanium dioxide, iron oxide, chromium oxide, azo/diazo dyes, phthalocyanines, dioxazines and carbon black and additional polyols. The foam of this invention is preferably a flexible foam.

The organic polyisocyanate may be an aromatic or aliphatic polyisocyanate, polymeric isocyanate, aromatic diisocyanate and aliphatic diisocyanate. Exemplary polyisocyanates include m-phenylene diisocyanate, tolylene-2-4-diisocyanate, tolylene-2-6-diisocyanate, hexamethylene-1, 6-diisocyanate, tetramethylene-1,4-diisocyanate, cyclohexane-1,4-diisocyanate, hexahydrotolylene diisocyanate, naphthylene-1,5-diisocyanate, methoxyphenyl-2,4-diisocyanate, diphenylmethane-4,4'-diisocyanate, 4,4'biphenylene diisocyanate, 3,3'dimethoxy-4,4'biphenyl diisocyanate, 3,3'-dimethyl-4-4'-biphenyl diisocyanate, 3,3'-dimethyldiphenylmethane-4—4'-biphenyl diisocyanate, 4,4', 4'-triphenyl methane triisocyanate, polymethylene polyphenylisocyanate and tolylene-2,4,6-triisocyanate, 4,4'-dimethyldiphenylmethane-2,2'5,5'-tetraisocyanate. Preferably the polyisocyanate is diphenylmethane-4,4'-diisocyanate (MDI), tolylene-2-4diisocyanate, tolylene-2-6-diisocyanate or mixtures thereof. Tolylene-2-4-diisocyanate, tolylene-2-6-diisocyanate and mixtures thereof are generically referred to as TDI.

The amount of polyisocyanate used in making polyurethane is commonly given by the isocyanate index. The isocyanate index can be given by the equation:

$$\text{Isocyante Index} = \frac{\text{Actual amount of isocyanate used}}{\text{Theoretical amount of isocyanate}} \times 100$$

The theoretical equivalent amount of isocyanate is the stoichiometric amount of isocyanate required to react with the polyol and any other reactive additives such as water. The isocyanate index may be varied over a range to affect properties of a foam that is produced. Generally, a higher index produces a harder foam which is thought to be due to increased covalent cross-linking of isocyanate reactive sites. In the production of flexible slabstock foams, the isocyanate index typically ranges from about 105 to 115. In molded flexible foams, the isocyanate index typically ranges from about 85 to about 110.

The blowing agent may be water, a low boiling hydrocarbon such as pentane, hexane, heptane, pentene, and heptene, directly added carbon dioxide, an azo compound such as azohexahydrobenzodnitrile or a halogenated hydrocarbon such as dichlorodifluoroethane, vinylidene chloride and methylene chloride.

In the formation of the polyurethane foam, it may be desirable to react the polyisocyanate and polymer polyol in the presence of a catalyst. The catalyst may catalyze the polyol-isocyanate or water-isocyanate reaction. Representative catalysts include:

(a) tertiary amines such as trimethylamine, triethylamine, N-n-methylmorpholine, N-ethylmorpholine, N,N-dimethylbenzylamine, N,N-dimethylethanolamine, N,N,N', N'-tetramethyl-1,4-butanediamine, N,N-dimethylpiperazine, 1,4-diazobicyclo[2,2,2]octane, bis(dimethylaminoethyl)ether and triethylenediamine;

(b) tertiary phosphines such as trialkylphosphines and dialkylbenzylphosphines;

(c) chelates of various metals such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni;

(d) acidic metal salts of strong acids such as ferric chloride, stannic chloride, stannous chloride, antimony trichloride, bismuth nitrate and bismuth chloride;

(e) strong bases such as alkali and alkaline earth metal hydroxides, alkoxides and phenoxides;

(f) alcoholates and phenolares of various metals such as Ti(OR)$_4$, Sn(OR)$_4$ and Al(OR)$_3$, wherein R is alkyl or aryl and the reaction products of the alcoholates with carboxylic acids, Beta-diketones and 2-(N,N-dialkylamino)alcohols;

(g) salts of organic acids with a variety of metal such as alkali metals, alkaline earth metals, Al, Sn, Pb, Mn, Co, Ni and Cu including, for example, sodium acetate, stannous octoate, stannous oleate, lead octoate, metallic driers such as manganese and cobalt naphthenate;

(h) organometallic derivatives of tetravalent tin, trivalent and pentavalent As, Sb and Bi and metal carbonyls of iron and cobalt and (i) mixtures thereof.

Catalysts are typically used in small amounts, for example, each catalyst being employed from about 0.0015 to about 5% by weight of the polyurethane reaction mixture (i.e., all of the components used to make the foam).

When forming a foam, a surface active agent is commonly incorporated into the reactant mixture to stabilize the rising foam, lower bulk surface tension, emulsification of incompatible components in the reactant mixture and counteract the defoaming effect of any solids added to or formed during the foam reaction. Examples of surface active agents include nonionic surfactants and wetting agents such as those prepared by the sequential addition of propylene oxide and then ethylene oxide to propylene glycol, the solid or liquid organosilicones, polyethylene glycol ethers of long chain alcohols, tertiary amine or alkylolamine salt of long chain alkyl acid sulfate esters, alkyl sulfonic ester and alkyl arylsulfonic acids. The surface active agents prepared by the sequential addition of propylene oxide and then ethylene oxide to propylene glycol and the solid or liquid organosilicones are preferred. Liquid organosilicones which are not hydrolyzable are more preferred. Examples o#nonhydrolyzable organosilicones include those available under the trademarks "DOW CORNING 5043," "DOW CORNING 5169" and "DOW CORNING 5244," available from Dow Corning Corp., and "Y-10515," available from Union Carbide Corp. Surface active agents are typically used in small amounts, for example, from about 0.0015 to about 5% by weight of the polyurethane reaction mixture (i.e., all of the components used to make the foam).

Chain extending agents may be used in the formation of the polyurethane foam. Examples include those compounds which have at least two active hydrogen groups such as primary and secondary aliphatic or aromatic monoamines or diamines. Representative amines include diethanolamine, monoethanolamine, phenylene diamine, bis(3-chloro-4-aminophenyl)methane, 2,4-diamino-3,5-diethyl toluene, trisecondary butanolamine, isopropanaolamine, diisopropanolamine, N-(2hydroxypropyl)ethylenediamine and N,N'-di(2hydroxypropyl)ethylenediamine.

The additional polyol can be any one of the previously described polyols.

The polyurethane foam desirably has a halogen concentration derived from the di-substituted halogenated phenyl monomer of at most about 10%, preferably at most 3%, more preferably at most 2%, and most preferably at most about 1% to greater than 0%, preferably greater than about 0.05%, more preferably greater than 0.1%, and most preferably greater than about 0.15% by weight of the foam. Preferably the halogen is chlorine, bromine, iodine or mixture thereof. More preferably the halogen is bromine. Halogens may be incorporated into the foam from additional halogenated monomers present in the polymer polyol such as chlorostyrene, dichlorostyrene, bromostyrene or by halogen containing fire retardants added to the foam. The total halogen concentration of the foam can be determined by atomic flame emission, atomic absorption, atomic fluorescence or atomic emission spectroscopy described in *Instrumental Methods of Analysis*, H. H. Willard, et al., Wadsworth Pub. Co., pp. 127–176, 1981, incorporated herein by reference.

MVSS-302 flammability test is a timed burn test of a polyurethane foam slab which is 0.5" thick ×4" wide ×14" long. A flame burning normal to the plane defined by the width and length of the slab is placed under one end of the slab and the burn rating is assessed. The burn rate is calculated on the time it takes the flame to travel a distance along the length of the slab. There are 5 ratings of the polyurethane in the test:

(1) DNI: Does not ignite.

(2) SE: (Self extinguishing) ignites but does not burn past 1.5 inches from the flame end during the test.

(3) SE/NBR602: ignites but stops burning within 60 seconds after the foam burns past 1.5 inches from the ignited end and the foam burns less than 3.5 inches from the ignited end.

(4) SE/Bx: burns greater than 60 seconds and more than 3.5 inches from the ignited end but extinguishes before burning 13.5 inches from the ignited end (x=burn rate "distance/min"), and (5) Bx: burns 13.5 inches from the ignited end.

The foam desirably has a flammability rating which is as good or better than a "Bx" of 100 mm/min as required by Fed. Reg. 38 No. 5 3—3, Nov. 6, 1973, for automotive seating. Preferably the foam has a rating of SE/NBR602, more preferably a rating of SE, and most preferably a rating of DNI. The numerical flame spread rating described herein is not intended to reflect hazards presented by this or any other material under actual fire conditions.

EXAMPLES

Preparation of Copolymer Polyol

Example 1

The polymer polyol of this example is made using a reactor equipped with a thermocouple, temperature control, stirrer and a feed port. The reaction is carried out under a nitrogen atmosphere at a temperature of about 125° C. and at a pressure ranging from about 275 to about 325 kPa. The reactants and products are constantly agitated throughout the reaction. Initially, the reactor, which is at room temperature, is charged with 1075 parts by weight (pbw) polyol A (glycerine initiated block polyether polyol which is formed from 86% by weight propylene oxide (PO) and 14% by weight ethylene oxide (EO), the polyol having an OH number of about 37.4 mg KOH/g) and 75 pbw of stabilizer (the condensation product of 1 mole of vinyl trimethoxysilane and 3 moles of a glycerine initiated block polyether polyol formed from 87% by weight PO and 13% by weight EO and having an OH number of about 47.9 mg KOH/g). This initial charge is then heated to the reaction temperature (i.e., 125° C.). A slurry of 11.4 ppw VAZO 67 initiator (2,2'-azo-bis(2-methylbutanenitrile available from E. I. Dupont de Nemours and Co. in 650 ppw polyol A, is then fed into the reactor at a rate of about 3.4 pbw/min. After the VAZO slurry has been fed into the reactor for about 2 minutes, a monomer feed consisting of about 600 pbw styrene, 480 pbw acrylonitrile, 120 pbw DERAKANE 510A and 36 pbw dodecylmercaptan is fed into the reactor at a rate of about 13.7 pbw/min until exhausted (i.e., about 90 minutes). 120 pbw of DERAKANE 510A is equivalent to adding about 70 pbw of MEDTA. Once the monomer feed has been exhausted the feed rate of the VAZO slurry is raised to about 8.2 pbw/min until exhausted (total feed time of VAZO slurry is about 135 minutes). After finishing feeding the VAZO slurry, residual monomers are stripped by applying a vacuum to the reactor for three hours while maintaining the temperature at 125° C. The polymer polyol formed is subsequently cooled to room temperature and removed from the reactor.

The polymer polyol of this example has a viscosity of 5800 mPas as measured by a Brookfield viscometer using a LV-3 spindle at 12 RPM, a solids content of 40.6% by weight as measured by a Praxis pulsed NMR and a volume average particle size of 0.5 micrometer in diameter as measured by Horiba LA-500 particle size analyzer. The halogen content of the polymer polyol is about 1% by weight of the polymer polyol.

Example 2

A polymer polyol is made by the same procedure described in Example 1 except the amounts of materials used are different and the DERAKANE 510A is separately added to the reactant mixture after the styrene and acrylonitrile had already been added for approximately 30 minutes. The styrene and acrylonitrile feed continues with the DERAKANE 510A feed. The amount of components and properties of the polymer polyol of Example 2 are also shown in Table 1.

Example 3

A polymer polyol is made by the same procedure as described in Example 1 except that bisallylether tetrabromobisphenol A is used instead of the DERAKANE 510A and the amounts of materials employed are different as shown in Table 1. The amount of components and properties of this polymer polyol are also shown in Table 1.

Comparative Example 1

A polymer polyol is made by the same procedure as described in Example 1 except that dibromostyrene is used instead of DERAKANE 510A and the amounts of materials employed are different as shown in Table 1. The component amounts and properties of this polymer polyol are also shown in Table 1.

Comparative Example 2

A polymer polyol is made by the same procedure as described in Example 1 except that pentabromobenzylacrylate is used instead of DERAKANE 510A and the amounts of materials employed are different as shown in Table 1. The component amounts and properties of this polymer polyol are also shown in Table 1.

Preparation of Polyurethane Foams

Example 4

About 30 pbw of the Example 1 polymer polyol is mixed with about 70 pbw of a polyol B (sucrose and glycerine initiated formed from 86% by weight PO and 14% by weight EO cap and having a hydroxyl (OH) number of about 32.6 mg KOH/g polyol and a functionality of about 3.4) which results in a polymer polyol dispersion having a polymeric solids content of about 12 parts by weight per hundred parts by weight of total polyol (12 pph). The following components are then added to the polymer polyol dispersion in parts per hundred of total polyol (pph):

(1) 0.5 pph DOW CORNING 5043 silicone surfactant, (2) 0.5 pph DOW CORNING 5169 silicone surfactant, (3) 2.0 pph diethanolamine, (4) 0.15 pph DABCO 33-LV catalyst (33% triethylene diamine in dipropylene glycol) available from Air Products and Chemicals INC., (5) 0.08 pph NIAX A-1 catalyst (70% bis (dimethylaminoethylether) and 30% dipropylene glycol) available from Union Carbide Corp., (6) 0.60 pph NIAX A-4 catalyst available from Union Carbide Corp. and (7) 3.90 pph water.

The above blended polymer polyol (BPP) is reacted with an amount of toluene diisocyanate (TDI), available under the trademark "VORANATE T80" of The Dow Chemical Company, equivalent to an isocyanate index of 95. The BPP and TDI are mixed and reacted using a Hi-Tech RCM 30, a high pressure metering and mixing foam machine manufactured by Hi-Tech Engineering, Inc. of Grand Rapids, MI.

wherein the blended polymer polyol and toluene diisocyanate are delivered to a high pressure impingement mix-head at a pressure of 13–14 MPa. The BPP and TDI before and at the mix-head are maintained at about 23° C. The TDI and BPP after being mixed in the mix-head are poured into a 38 cm×38 cm×11 cm mold maintained at 68° C. Prior to filling, the mold is sprayed with Chem Trend release agent PRC-7166. Foams are demolded 4.5 minutes after filling of the mold and then are crushed through rollers once to 5.1 cm and once more to 2.5 cm. Foams are aged for 5 days and, subsequently, burn tested using the MVSS 302 method. None of the foam samples ignited (DNI) as per the MVSS 302 test method.

Example 5

The polyurethane of this example is made by the same procedure described in Example 4 except that an isocyanate index of 105 is used. None of the foam samples ignited (DNI) as per the MVSS 302 test method.

Example 6

The polyurethane of this example is made by the same procedure described in Example 4 except that the polymer polyol of Example 2 is used. None of the foam samples ignited (DNI) as per the MVSS 302 test method.

Example 7

The polyurethane of this example is made by the same procedure described in Example 6 except that an isocyanate index of 105 is used. None of the foam samples ignited (DNI) as per the MVSS 302 test method.

Example 8 (a) and (b)

The polyurethane of this example is made by the same procedure described in Example 4 except that the polymer polyol of Example 3 is used. The isocyanate index of Example 8(a) is 95 and the index for Example 8(b) is 105. The combined results of 8(a) and (b) are referred to herein as Example 8 and are as follows: about 60% of the foam samples did not ignite (DNI) as per the MVSS 302 test method. All of the samples had a rating of SE/NBR602 or better.

Comparative Example 3

The polyurethane of this example is made by the same procedure described in Example 4 except that the polymer polyol of Comparative Example 1 is used and the isocyanate index is 105. About 50% of the foam samples did not ignite (DNI) as per the MVSS 302 test method. About 80% of the samples had a rating of SE/NBR602 or better.

Comparative Example 4

The polyurethane of this example is made by the same procedure described in Example 1 except that the polymer polyol of Comparative Example 2 is used and the isocyanate index is 105. About 80% of the foam samples did not ignite (DNI) as per the MVSS 302 test method. About 90% of the samples had a rating of SE/NBR602 or better.

The results of these tests show that the polyurethanes made using the polymer polyols of this invention have surprisingly improved flame retardancy at reduced halogen (i.e., bromine) levels than the comparative examples. For example, the polyurethane foam of Example 5 displays improved flame retardancy compared to the polyurethane foam of Comparative Examples 3 and 4, even though the foam of Example 5 contains about half the amount of bromine present in the polyurethane foam of Comparative Examples 3 and 4. Also, the polyurethane foam of Example 8 has a better overall burn rating (all pass SE/NBR602) than the foams of Comparative Examples 3 and 4, even though the polymer polyol used to make the foam of Example 8 had a high viscosity and a halogen content lower than the polymer polyols used to make the foams of Comparative Examples 3 and 4.

TABLE 1

| Example # | 1 | 2* | 3 | Comp. 1 | Comp. 1 |
|---|---|---|---|---|---|
| Monomer Ratios, Wt % | | | | | |
| Styrene | 50 | 52 | 56 | 54 | 55 |
| Acrylonitrile | 40 | 40 | 38 | 40 | 40 |
| DERAKANE 510A | 10 | 8 | | | |
| Bisallylether Tetrabromobisphenol A | | | 6 | | |
| Dibromostyrene | | | | 6 | |
| Pentabromobenzylacrylate | | | | | 5 |
| Monomer Feed, min. | 90 | 90 | 73 | 64 | 68 |
| Monomer Feed, (pbw) | | | | | |
| Styrene | 600 | 499 | 672 | 648 | 660 |
| Acrylonitrile | 480 | 384 | 451 | 480 | 480 |
| DERAKANE 510 A | 120 | 77 | | | |
| Bisallylether Tetrabromobisphenol A | | | 72 | | |
| Dibromostyrene | | | | 72 | |
| Pentabromobenzylacrylate | | | | | 60 |
| VAZO Slurry (pbw) | | | | | |
| VAZO 67 | 11.4 | 9.1 | 11.4 | 11.4 | 11.4 |
| Polyol A | 650 | 520 | 650 | 650 | 650 |
| Dodecylmercaptan | 36 | 16 | 12 | 12 | 12 |
| Initial Reactor Charge, (pbw) | | | | | |
| Polyol A | 1075 | 1445 | 1112 | 1112 | 1075 |
| Stabilizer | 75 | 75 | 38 | 38 | 75 |
| Copolymer Polyol Properties | | | | | |
| Solids Content, Wt % | 40.6 | 34.4 | 41.0 | 40.0 | 40.9 |
| Viscosity, mPas | 5800 | 4100 | 17000 | 5130 | 5500 |
| Mean Particle Size, μ | .52 | .44 | .50 | .51 | .40 |
| Bromine concentration wt. % | 0.8% | 0.6% | 1.3% | 1.5% | 1.6% |

* Note Monomer feed in this example only includes Styrene and Acrylonitrile; DERAKANE is added separately as described herein.

What is claimed is:

1. A dispersion of particles of a polymer of an addition polymerizable monomer having the structure:

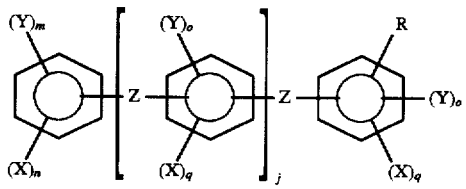

wherein j is a whole number from 0 to 4,

Z is selected from the group consisting of:
  a single bond;
  a substituted or unsubstituted divalent hydrocarbon radical that is $OCH_2CH(OH)CH_2O$, methylene or a methylene substituted with a radical selected from the group consisting of: $CH_3$, $C_2H_5$, $C_3H_7$, n-$C_3H_7$, i-$C_3H_7$, cyclohexyl, bicyclo[2.2.1]heptyl, phenyl, $CF_2$, $CF_3$, $CCL_3$, $CF_2CL$, CN, $(CH_2)_2COOCH_3$ and $PO(OCH_3)_2$ and a divalent radical selected from the group consisting of: S, $S_2$, SO, $SO_2$, O and CO, X is a halogen wherein "n" is an integer from 1 to 5 and "q" is an integer from 1 to 4, R is an ethylenically unsaturated hydrocarbon monovalent radical having:
  (a) up to about 12 carbons wherein R is a substituted or unsubstituted hydrocarbon monovalent radical that is linear or branched, provided that when R is substituted, said substituted radical is substituted with a substituent selected from the group consisting of: an ether; ester; hydroxyl and carbonyl and
  (b) at least one free radical polymerizable carbon—carbon double bond, and Y is a monovalent radical selected from the group consisting of:
hydrogen;
mercaptan;
hydroxyl and
a substituted or unsubstituted hydrocarbon monovalent radical that (i) has at most about 12 carbons and (ii) is linear or branched, provided that when Y is the substituted hydrocarbon radical, said substituted radical is substituted with a substituent selected from the group consisting of: an other; ester; hydroxyl and carbonyl, wherein "o" is an integer equal to 4 minus "q" and " " is an integer equal to 5 minus "n" in a polyol.

2. The dispersion of claim 1 wherein X is chlorine, bromine, iodine or mixtures thereof.

3. The dispersion of claim 2 wherein X is bromine.

4. The dispersion of claim 1 wherein Z is $OCH_2CH(OH)CH_2O$, methylene or a methylene substituted with a radical selected from the group consisting of: $CH_3$, $C_2H_5$, $C_3H_7$, n-$C_3H_7$, i-$C_3H_7$, cyclohexyl, bicyclo[2.2.1]heptyl, phenyl, $CF_2$, $CF_3$, $CCl_3$, $CF_2Cl$, CN, $(CH_2)_2COOCH_3$ and $PO(OCH_3)_2$.

5. The dispersion of claim 4 wherein the methylene is substituted with two $CH_3$ monovalent radicals.

6. The dispersion of claim 1 wherein R is a monovalent linear or branched radical.

7. The dispersion of claim 6 wherein R is a branched radical.

8. The dispersion of claim 7 wherein the branched radical contains oxygen.

9. The dispersion of claim 8 wherein the branched radical is methacrylic ester of diglycidylether represented by the structure:

$$-O-CH_2-CH(OH)-CH_2-O-C(=O)-C(CH_3)=CH_2$$

10. The dispersion of claim 1 wherein the monomer is methacrylic ester of diglycidylether of tetrabromobisphenol A.

11. The dispersion of claim 1 wherein the polymer is a copolymer of the monomer and a copolymer monomer.

12. The dispersion of claim 11 wherein the copolymer monomer is styrene, acrylonitrile or a mixture thereof.

13. The dispersion of claim 12 wherein X is chlorine, bromine, iodine or mixtures thereof.

14. The dispersion of claim 13 wherein X is bromine.

15. The dispersion of claim 11 wherein Z is methylene or a methylene substituted with a radical selected from the group consisting of: $CH_3$, $C_2H_5$, $C_3H_7$, n-$C_3H_7$, i-$C_3H_7$, cyclohexyl, bicyclo[2.2.1]heptyl, phenyl, $CF_2$, $CF_3$, $CCl_3$, $CF_2Cl$, CN, $(CH_2)_2COOCH_3$ and $PO(OCH_3)_2$.

16. The dispersion of claim 15 wherein the methylene is substituted with two $CH_3$ monovalent radicals.

17. The dispersion of claim 11 wherein R is a monovalent linear or branched radical.

18. The dispersion of claim 17 wherein R is a branched radical.

19. The dispersion of claim 18 wherein the branched radical contains oxygen.

20. The dispersion of claim 19 wherein the branched radical is methacrylic ester of diglycidylether represented by the structure:

$$-O-CH_2-CH(OH)-CH_2-O-C(=O)-C(CH_3)=CH_2.$$

21. The dispersion of claim 11 wherein the monomer is methacrylic ester of diglycidylether of tetrabromobisphenol A.

22. The dispersion of claim 12 wherein the monomer is methacrylic ester of diglycidylether of tetrabromobisphenol A.

* * * * *

UNITED STATES PATENT AND TRADEMARK OFFICE
CERTIFICATE OF CORRECTION

PATENT NO. : 5,741,847
DATED : April 21, 1998
INVENTOR(S) : Wayne R. Willkomm; Ruben Solis; Kenneth J. Hinze It is certified that error appears in the above-identified patent and that said Letters Patent is hereby corrected as shown below:

Claim 1, column 15, line 32, following " insert -- m --

Signed and Sealed this

Sixth Day of October, 1998

Attest:

BRUCE LEHMAN

*Attesting Officer*   Commissioner of Patents and Trademarks